Oct. 26, 1937.  J. A. FRIED  2,096,741
GOVERNOR
Filed Nov. 8, 1935  2 Sheets-Sheet 1
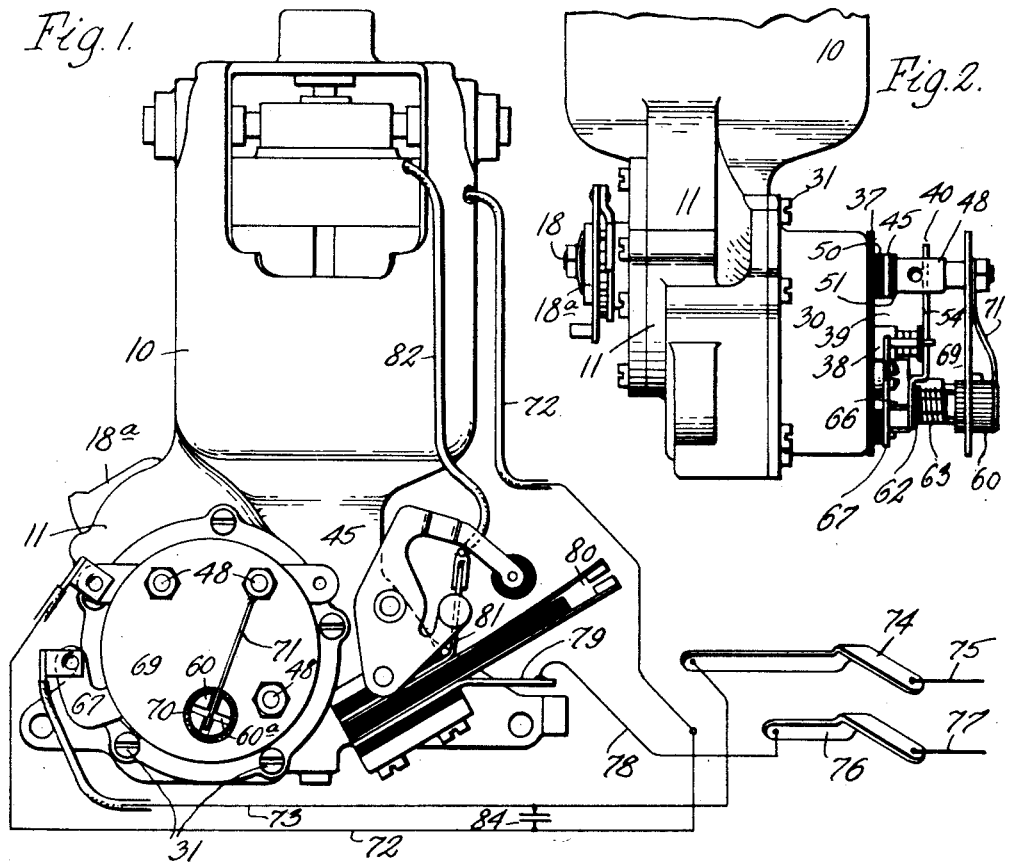
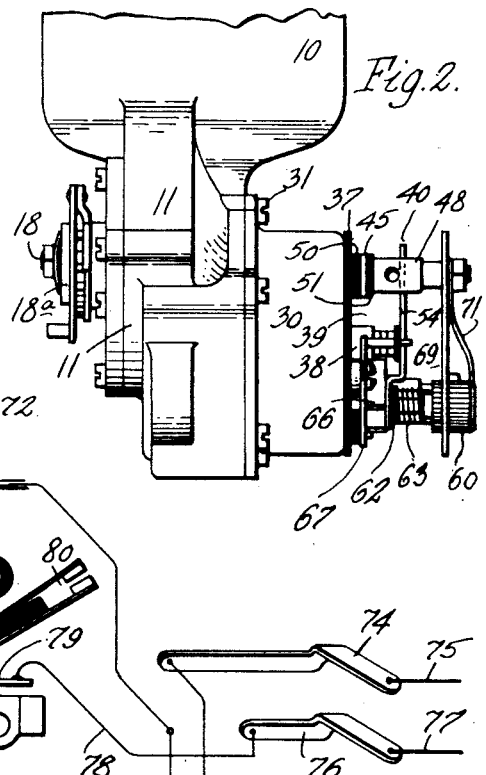
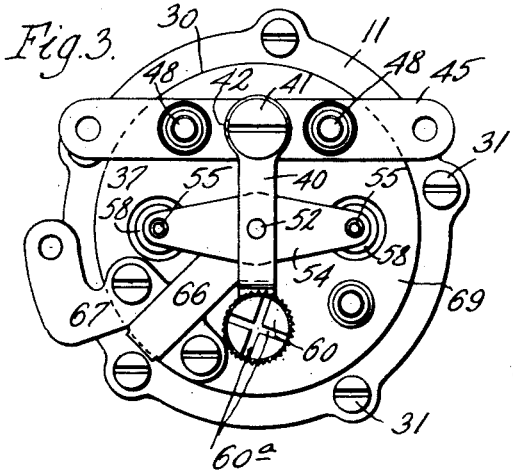
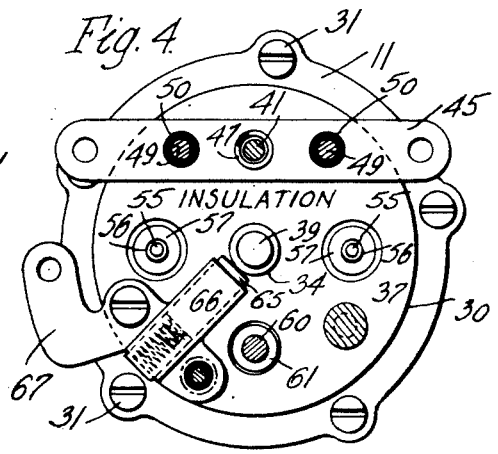
INVENTOR.
Jerome A. Fried
by Parker, Brockman & Farmer
ATTORNEYS Oct. 26, 1937.  J. A. FRIED  2,096,741
GOVERNOR
Filed Nov. 8, 1935  2 Sheets-Sheet 2

INVENTOR.
Jerome A. Fried
By Parker, Brockunds Farmer
ATTORNEYS.

Patented Oct. 26, 1937

2,096,741

UNITED STATES PATENT OFFICE 2,096,741

GOVERNOR

Jerome A. Fried, Ithaca, N. Y., assignor to Allen Wales Adding Machine Corporation, Ithaca, N. Y.

Application November 8, 1935, Serial No. 48,890

17 Claims. (Cl. 200—80)

This invention relates to circuit breakers, and particularly to those which are operated by centrifugal forces in order to regulate or govern, for example, the speed of an electric motor, and thus prevent the motor from exceeding a predetermined speed. Such speed governors are particularly useful in connection with adding machines and other calculating machines, wherein an operating motor is intermittently operated and connected to the calculating mechanism. In such machines it is desirable that the mechanism be operated at a rapid rate, but if the speed is too rapid, the mechanism fails to function properly. Because of the existence of A. C. and D. C. current, of different cycles of A. C. current, of different voltages of current in different cities, and of the fluctuations of voltage in any current at different times, the speed of the motors is likely to vary materially at intervals unless some regulation is provided therefor. This improved circuit breaker is in the nature of an improvement upon the device shown in my prior copending application, Ser. No. 735,234 filed July 16, 1934 for Governors for electric motors.

An object of the invention is to provide an improved governor for a high speed electric motor, which will successfully control the speed of a motor, even when the governor is driven from a relatively low speed shaft, especially where it is not feasible to put the governor on the motor shaft because of the high speed of the motor, and space limitations, and with which maximum centrifugal force may be available without large weights and by compact mechanism.

Another object of the invention is to provide an improved device for governing the speed of an electric motor, which will operate successfully even where the motor is operated intermittently for only a short interval of time at each cycle of operation; which will be sensitive, quickly responsive, and accurate in controlling the speed of the motor within close limits and over a considerable range of operating voltage; with which the controlled speed may be varied within desired limits in a simple manner; which will operate for long periods of time without servicing or attention; with which adjustments for wear of the contacts may be made in a simple manner; and which will be relatively compact, dependable, simple, durable and inexpensive.

Other objects and advantages will be apparent from the following description of one embodiment of the invention, and the novel features will be particularly pointed out in the appended claims.

In the accompanying drawings:

Fig. 1 is an elevation of a motor with a governor therefor constructed in accordance with this invention, and as applied to the operation of calculating mechanism at intermittent intervals;

Fig. 2 is a side elevation thereof;

Fig. 3 is a front elevation of the governor mechanism, similar to Fig. 1, but with one of the plates removed to illustrate parts otherwise concealed;

Fig. 4 is a transverse, sectional elevation through the governor at the rotating contact;

In the illustrated embodiment of the invention, the governor is applied to the control of a high speed electric motor 10 of a type used for the operation of calculating mechanism, such as is found in an adding machine, where the motor is given successive, intermittent operations of a definite cycle in order to drive the running-in or operating mechanism. Such a motor replaces the usual hand crank which operates similar mechanisms in the manually operated type of adding machines. It will be understood, however, that the governor is of general application, and may be used for controlling motors for various other purposes where similar problems are encountered. The electric motor 10 may be of any suitable size and type, and when applied to an adding machine, it usually drives the running-in or operating mechanism through the medium of a clutch mechanism that disconnects the motor and deenergizes it after a predetermined cycle of operation.

In calculating machines the space available for a motor and governor is very limited, and in order to obtain the necessary power, a motor with a speed of from 8000 to 12,000 R. P. M., or more than twice the speed of the usual motor used heretofore, was found advisable. This unusually high motor speed raised a particular problem in speed regulation, making it inadvisable to mount the governor directly on the motor shaft.

Figure 5:
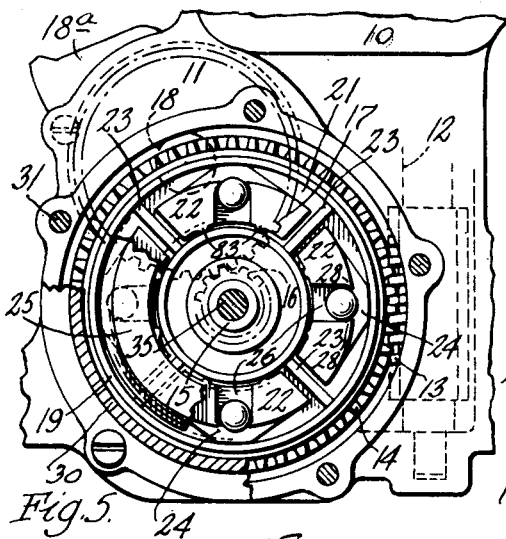
Fig. 5 is a transverse sectional elevation through the governor, the section being taken just in front of the governor weights.

The motor, as shown, is enclosed in a housing with the armature of the motor vertical. The lower end of the casing of the motor terminates in a housing 11 which contains suitable speed reduction gearing. For example, the lower end of the shaft 12 of the motor armature, Fig. 5, is provided with a driving worm screw 13, which meshes with and drives a worm wheel 14 that is mounted on a shaft 15. The shaft 15 carries a pinion 16, Figs. 5 and 6, which meshes with a gear 17 mounted on a shaft 18 of a one-revolution clutch mechanism 18a, Fig. 2, through which the motor operates the running-in or calculating mechanism of an adding machine. The shaft 15 extends forwardly of the housing 11 through an open face thereof and in front of the worm gear 14, as shown clearly in Fig. 6. A hollow annular shell or casing 19 abuts endwise against the forward face of the gear 14 and is secured thereto for rotation therewith in any suitable manner such as by rivets, or screws 20.

Figure 8:
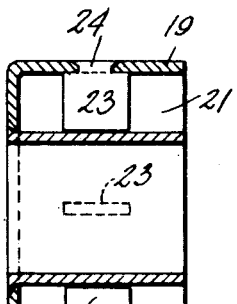
Fig. 8 is a sectional elevation through a part of one of the elements of the governor, to illustrate certain details of construction.
Figure 9:
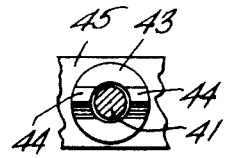
Fig. 9 is a sectional elevation through the mounting for the contact lever.

The shell 19 is disposed on the gear 14 concentrically of the shaft 15, its end which abuts against the gear 14 being closed, and the opposite end of the annular shell being open. The chamber 21 in the annular shell 19 is annular in shape and concentric with the shaft 15 and its axis of rotation, and serves as a chamber for a plurality of centrifugal weights 22. The weights 22 are spaced from one another in a direction circumferentially of the chamber 21, and are held against movement around the chamber by studs or partitions 23, Figs. 5 and 8, which may for convenience be stampings of sheet metal having reduced shanks 24 that pass through apertures in the outer wall of the shell 19 and are upset at their outer ends in order to rivet the walls 23 in position. The partitions 23 divide the annular chamber 21 into a plurality of compartments or pockets, in each of which a weight 22 may be placed.

Each weight 22 is preferably free or loose in its pocket in said chamber, and is provided at the inner or closed end of its chamber or pocket with an outwardly extending heel 24 which engages against the outer wall of the annular chamber 21 and acts as a fulcrum about which the remainder or other end of the weight swings in a direction radially with respect to the shaft 15. Each weight 23, except for the heel 24, is of materially less thickness than the depth of the annular chamber 21, so that when the weights are rotated with the shell 19, centrifugal action will cause the free or swinging ends of the weights 22 to swing outwardly and radially in the annular chamber 21. An annular ring 25 is disposed in the open end of the annular chamber 21, so as to move into and out of the same, and when moved inwardly in the chamber 21 it takes a position in which it may be engaged and operated by the outwardly swinging ends of the weights 22.

In order to reduce the friction between the outwardly swinging ends of the weights 22 and the ring or pressure disc 25, I preferably provide ball bearings between the weights and the ring, which will now be described. The swinging end of each weight, which is the end nearest the ring 25, is provided with a slot or notch 26 extending from face to face, the bottom wall of which slot is inclined to the axis of the shaft 15 and facing outwardly. A bearing ball 27 is disposed in each slot 26, so as to roll along the inclined bottom wall thereof. The side walls of each slot or notch 26, at the outer end thereof, are upset as at 28 slightly into the slot, so as to prevent escape of the ball through that restricted end of the slot. The outer periphery of the ring 25 is also provided with a lateral flange 29 which somewhat overhangs the swinging or outer ends of the weights, and also opposes escape of the balls 27 in an outward and radial direction. The ring 25 also prevents escape of the balls 27 from the slots 26 in a direction parallel to the shaft 15.

The inclined bottom walls of the slots 26 with which the bearing balls 27 engage, will act as inclined cam surfaces, and whenever the slotted ends of the weights are swung outwardly about their heels 24, due to centrifugal action, the inclined bottoms of the slots in the weights will cam the balls 27 in a direction endwise along the shaft 15, thus forcing the ring 25 in a direction outwardly of the annular chamber 21.

A casing 30 is secured over the open face of the housing 11 from which the shaft 15 extends, and is secured to the casing 11 in any suitable manner such as by screws 31 which pass through a flange of the casing 30 into the housing 11. The casing 30 thus telescopes somewhat over the shell 19 and with the housing 11 encloses it. The casing 30 is generally annular and cup-shaped, with its open face towards the shell or housing 11, and with a tubular boss or sleeve 32 projecting from the bottom wall of the casing 30 toward the open face thereof and telescoping within the annular shell 19 and around the shaft 15. This boss 32 preferably carries an oilless bearing sleeve 33 such as of porous bronze which provides a bearing for the shaft 15.

Figure 6:
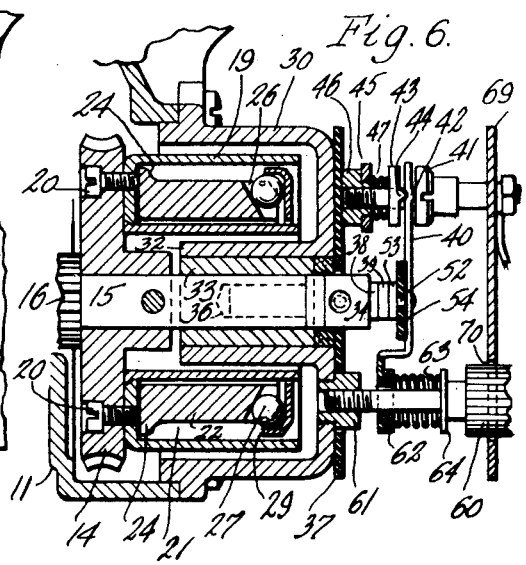
Fig. 6 is a longitudinal sectional elevation through the governor, the section being taken approximately through the central axis thereof.
Figure 7:
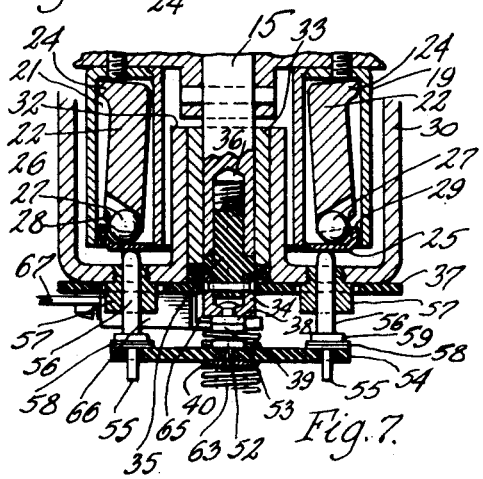
Fig. 7 is a sectional plan through the governor, the section being taken approximately through the central axis thereof at approximately a right angle to the section of Fig. 6.

A cup-shaped collector or sleeve 34, Fig. 7, is fitted over and secured to a reduced end of an insulating stud 35, Figs. 6 and 7, such as of bakelite, and the other end of that stud is reduced in cross-section and threaded into a recess 36 provided in the end of the shaft 15. The sleeve 34 and stud 35 thus serve as an extension or continuation of the shaft 15 and rotate therewith, and the maximum diameter of the sleeve 34 and stud 35 are the same as of the shaft 15.

The outer end of the bearing bushing 33 terminates somewhat within the boss 32, Figs. 6 and 7, and a ring 33a of cork or other electricity insulating material is disposed against the outer end of the bushing or sleeve 33 to extend flush with the outer face of the bottom or end wall of the casing 30. A plate 37 of insulating material is secured against the outer face of the bottom or end wall of casing 30. The inner end of the collector 34 is spaced by the ring 33a and the stud 35 from the bearing bushing 33 and the casing 30, and thus the collector 34 is electrically insulated from casing 30, bushing 33 and shaft 15. The sleeve or collector 34 extends outwardly beyond the plate 37, a substantial distance for contact with a brush as will be explained hereinafter.

A contact stud 38, faced on the end with a suitable arc resisting contact material 39, such as of tungsten, abuts against the outer end of the collector or sleeve 34 and has a shank or stem of reduced cross section which extends through an aperture in the end of the sleeve 34 and is then upset on the inside of the sleeve 34, by which the stud 37 will be riveted to the end of the sleeve 34, so as to form an extension thereof. Since it rotates with the shaft 15, this contact 39 may be advantageously referred to as a rotating contact.

A contact lever or support 40, Figs. 6 and 7, extends across the end of, and in spaced relation to, the contact 39, and at one end is apertured to fit loosely over the shank of a screw 41. This lever 40 may be a stamping of sheet metal such as of copper or bronze, and on opposite sides of the aperture through which the shank of the screw 41 extends, the strip or lever 40 may have V-shaped corrugations 42 drawn therein toward the under face of the head of the screw 41, the corrugations 42 being aligned endwise of one another on opposite sides of the screw 41. These V-shaped corrugations 42 engage with the under or inner face of the head of the screw 41 to constitute a fulcrum about which the lever 40 may rock. A metal washer or disk 43 is also disposed on the shank of the screw 41 below the lever 40, and this disk 43 at opposite sides of the screw 41 has aligned knife edge projections 44, which engage with the drawn corrugations 42 of the lever 40 and confine the lever 40 against the under face of the head of the screw 41.

The portion of the shank of the screw 41 beyond the disk 43 passes through an aperture in a metal contact bar 45 and threads into a nut 46 which has a reduced end riveted into that aperture in the bar 45. A coil spring 47 confined between the bar 45 and the disk 43 urges the latter yieldingly against the contact lever 40 and thus yieldingly confines the lever 40 against the under face of the head of the screw 41. By threading the screw 41 into and out of the nut 46, the fulcrumed end of the lever 40 may be shifted bodily toward and from the casing 30, without in any way interfering with its rocking contact with the under face of the head of the screw 41.

Figure 10:
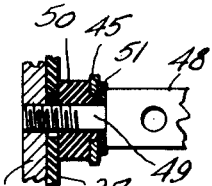
Fig. 10 is a sectional elevation through a small portion of the governor to illustrate the mounting and insulation of conductor bars.

The metal contact bar 45 is mounted on and insulated from the bottom end or wall of the casing 30 in any suitable manner, such as is shown particularly in Figs. 4 and 10. A plurality of metal posts 48 have reduced ends 49 which are threaded into the bottom wall of the casing 30, so that the posts project outwardly therefrom. The shanks 49 pass through apertures in the insulating plate 37 and also loosely through apertures in the bar 45. A bushing 50 of insulating material is disposed on the shank 49 of each post 48 so as to abut against the insulating plate 37, and the outer end of each bushing 50 has a reduced shank or end which fits into the aperture in the bar 45 through which the shank 49 extends, so as to insulate the bar 45 from the shank 49.

A washer 51 of insulating material is also fitted on the shank 49 of each post 48, between the bar 45 and the adjacent shoulder of the post 48 from which the shank 49 extends. From this it will be observed that the posts 48 securely and firmly mount the bar 45 on the casing 30 in spaced relation to the insulating plate 37, yet by reason of the sleeve 50 and washer 51 of insulating material which directly mount the bar 45 and are confined on the posts 48, the bar 45 will be insulated from the casing 30 and the posts.

The contact lever 40 carries a stud 52 which extends toward the rotating contact 39 and mounts an arc resisting contact 53. Hence, when the lever 40 is rocked about its fulcrum bearing on the screw 41, the contact 53 will be carried into and out of contact against the end of the rotating contact 39. A bridge 54 of insulating material is confined on the shank of the stud 52 between the contact 53 and the under face of the lever 40, and this bridge 54 extends in a direction crosswise of the lever 40, as shown in Fig. 3. The ends of the bridge 54 are provided with apertures which fit over extensions 55, of reduced diameter, of push pins 56. The pins 56 are mounted for reciprocation in tubular bosses or sleeves 57 that pass through apertures in the insulating plate 37 and are provided on the bottom wall of the casing 30, the pins extending into the interior of the casing 30.

The inner ends of the push pins 56 bear against the outer end face of the ring 25, and when the ring 25 is forced outwardly, or in a direction along the shaft 15, by the outward swinging of the centrifugal weights 22, the push pins 56 will be forced in an outward direction by the ring 25, and in turn will push the insulating bridge 54 outwardly and thus rock the contact lever 40 outwardly in a direction to separate the contact 53 from the rotating contact 39. Any number of thin shims or washers 58 may be disposed on the extensions 55 between collars 59 on the push pins and the bridge 54, so that by adjusting the number of shims 58, the extent of movement of the ring 25 before it rocks the contact lever 40 far enough to separate the contacts 53 and 39 may be varied.

An adjusting screw 60, Figs. 1 to 4 and 6, has a shank threaded into a boss 61, Fig. 6, on the bottom wall or end of the casing 30. The shank of the screw 60 extends loosely through an aperture in the contact lever 40 at the free end thereof, and the lever 40 has a ring or washer 62 of insulating material disposed in the aperture through which the screw 60 extends, so as to insulate the contact lever 40 from the screw 60. The hole of the washer 62 is large enough so that the lever 40 may rock about its fulcrum on the screw 41 without danger of the washer 62 binding on the screw 60.

A coil spring 63 is confined on the screw 61 between a collar or shoulder 64 of the screw and the insulating washer 62, so as to exert a yielding, resilient pressure on the lever 40 in a direction to carry the contact 53 into engagement with the rotating contact 39. By rotating the screw 60, it will be threaded to various extents into or out of the boss 61, which will carry its shoulder or abutment 64 toward or away from the spring 63, and thus the spring pressure on the lever 40 may be varied merely by turning the screw 60 in one direction or the other, depending upon whether an increased or decreased pressure of the spring 63 on the contact lever 40 is desired.

Figure 12:
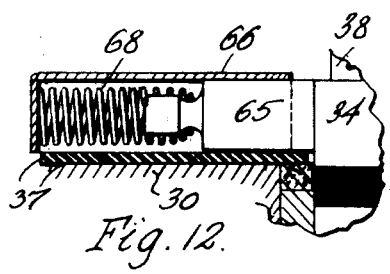
Fig. 12 is a sectional elevation through the brush unit which bears on the rotating contact.

A brush 65, Figs. 4, 7 and 12, is mounted for reciprocation in a brush box or housing 66 of metal which, in turn, is carried by a metal contact element 67, Figs. 4 and 12 particularly. The element 67 is mounted on and insulated from the casing 30 in any suitable manner, such as through the insulating plate 37. A spring 68, Fig. 12, is confined in the housing 66 so as to urge the brush 65 in an outward direction. The housing 66 is disposed radially of the shaft 15 so that the brush 65 will bear against the periphery of the collector 34 which rotates with the shaft 15.

A plate 69, Figs. 1, 2 and 6, is mounted and confined removably on shouldered outer ends of the posts 48, and this plate 69 is provided with an aperture 70, Figs. 1 and 6, through which the head of the screw 60 extends. The end face of the head of the screw 60 has radially milled slots 60a so as to provide a plurality of slots crossing one another in the end face, and a detent spring 71, mounted on one of the studs 48, is arranged to bear yieldingly upon the slotted end of the head of screw 60, and by snapping into any of the slots 60a, act as a detent thereon to hold the screw 60 in different adjusted positions into which it may be turned while adjusting the pressure on the spring 63.

One circuit wire 72, Fig. 1, leading from one side or terminal of the motor 10 is connected to one end of the contact bar 45, and the contact terminal 67 is connected by a conductor 73 to a contact post 74 of a detachable outlet connection, through which connection may be made to a line wire 75 supplying current to the motor. A contact post 76 is similarly connected to the other line wire 27, and this post 76 is in turn connected by a wire 78 to one contact 79 of a main motor control switch 80, the other terminal or contact 81 of the switch 80 being connected by a wire 82 to the other side or terminal of the motor 10. It will be observed from the description of the circuit to the motor 10 that the main switch 80 and the centrifugal switch operating the contacts 39 and 53 are both in series with one another and with the motor 10.

The main switch 80 may be closed in any suitable manner when an operation of the motor 10 is desired, and opened when the motor 10 is to be stopped. The switch formed by the contacts 39 and 53 is normally closed by reason of the action of the spring 63, but is opened whenever the speed of rotation of the shaft 15 is such that the centrifugal weights 22 are urged outwardly with sufficient force to overcome the action of spring 63 and move the ring 25 endwise along the shaft 15 and cause a separation of the contacts 39 and 53.

The separation of the contacts 39 and 53 will thus open the circuit of the motor 10 until the speed of the motor falls sufficiently so that the spring 63 can overcome the pressure exerted by the push pins 56 on the contact lever 40, whereupon the spring 63 will act through the push pins 56 to force the ring 25 endwise and cam the centrifugal weights 22 inwardly toward the shaft 15, and when that occurs the switch lever 40 may again rock in a direction to re-engage its contact 53 with the rotating contact 39.

Figure 11:
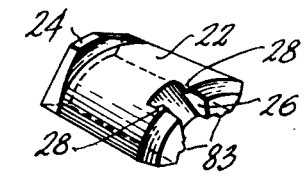
Fig. 11 is a perspective of one of the centrifugal weights.

The inner and outer faces of each centrifugal weight 22 are preferably concave and convex respectively so as to conform somewhat with the curvature of the walls of the annular chamber 25, and in order that the weights 22 may not adhere to the inner walls of the chamber 21 by adhesion or through a film of grease which may get between such abutting surfaces and prevent the outward movement of the weights 22 at the proper time, I preferably upset toward the shaft 15 the material in the swinging ends of the weights 22, as at 83, Fig. 11. These upset portions 83 are small, pin-like projections which contact with the inner wall of the chamber 21, and keep the remaining adjacent face of each weight 22 separated from the inner wall of the chamber 21 sufficiently to prevent adherence of the weight 22 to the inner wall of chamber 21. The upset sections 28 and 83 on the weights may be formed, for example, by prick punching the metal of the weights at the points indicated.

The inner ends of the weights 22 may be easily prevented from sticking to the inner end of the chamber 21, by allowing the securing screws or rivets 20 at their ends anchored to the shell 19 to project slightly into the chamber 21 where they are preferably rounded over or pointed to reduce the contact area between them and the weights to a minimum.

It will be noted that each weight 22, considered peripherally of the chamber 21, is an arc of a tubular cylinder, and by using three and preferably more of such weights, to complete or fill the peripheral space in chamber 21, the center of gravity of each weight will be further from the axis of shaft 15 than if only two of such weights of greater arcuate length are used. With the same total mass of the weights, but with the centers of gravity of the weights distributed further from the axis of shaft 15 because of the greater number of weights, the same rate of rotation of the shaft 15 will produce a greater centrifugal force on each weight and a greater total centrifugal force acting on the ring 25. This is an important consideration where maximum centrifugal force in a compact governor is necessary or desirable.

The operation of this improved governor or circuit breaker will be obvious from the foregoing description of the construction thereof, but will be briefly summarized. When the main switch 80 is closed in any suitable manner which is not material to this invention, the circuit to the motor 10 will be closed because the contacts 53 and 39 are normally engaged. The motor begins to operate and through its worm 13 it drives the worm wheel 14 and shaft 15, and the latter through the pinion 16 and gear 17, drives the shaft 18 of the cycle clutch mechanism 18a, Fig. 2, and through which the motor operates the running-in mechanism of an adding machine or any other suitable mechanism. The annular shell 19 rotates with the worm wheel 14, and since the centrifugal weights 22 are held against displacement circumferentially around the chamber 21 by the partition walls 23, the weights 22 will be forced to rotate with the shell 19 and the shaft 15.

As the speed of the motor increases, the centrifugal forces acting on the weights 22 will tend to throw them outwardly away from the shaft 15, and by reason of the engagement of the heels 24 of the weights with the outer wall of the chamber 21, the weights 22 will tend to fulcrum about the heels 24, thus causing the slotted ends of the weights 22 to swing outwardly and radially from the shaft 15. When the centrifugal forces acting on the weights 22 become strong enough, due to increased speed of rotation of the weights with the shell 19, to overcome the action of spring 63, the cam walls on the ends of the weights 22 will act through the bearing balls 27 to force the ring 25 in a direction endwise along the shaft 15, and the latter acting through the push pins 56 and bridge 54 will rock the contact lever 40 in a direction to separate the contact 53 from the rotating contacts 39.

This opens the circuit of the motor which will remain open until the speed of the motor falls and the centrifugal forces acting on the weights 22 can be again overcome by the spring 63, whereupon the lever 40 will rock in a direction to re-engage the contact 53 with the rotating contact 39 and again complete the circuit to the motor 10. Thus the supply of current to the motor 10 will be controlled in a manner to keep its speed below a predetermined speed, independently of fluctuations of voltage of the current supplied to the motor 10 and also independently of the load placed on the motor 10.

At about the end of a definite cycle of operation of the shaft 18, the main switch 80 will be opened automatically and the operation of the motor 10 stopped. It will be noted that the contact 53 does not rotate about the axis of the shaft 15, and therefore there will always be a moving or sliding contact between the rotating contact 39 and the relatively fixed contact 53, which keeps the engaging surfaces of those contacts clean, and free from objectionable irregularities that may be caused by current arcing between those contacts when the circuit is broken there. A condenser 84 may be disposed across the conductors 72 and 73 which lead from opposite sides of the switch formed of the contacts 39 and 53, so as to reduce sparking between those contacts wherever they are separated. When the contact 39 needs renewal, the sleeve 34 and its stud 35 may be unscrewed from the end of shaft 15 and repaced by a new unit of sleeve 34 and stud 35 which carries a new contact 39.

It will be understood that various changes in the various details, materials and arrangements of parts, which have been herein described and illustrated particularly by way of example, in order to explain the nature of the invention, may be made by those skilled in the art within the principle and scope of the invention, as expressed in the appended claims.

I claim as my invention:

1. A speed governor for an electric motor, comprising a member driven by said motor, a contact carried by and rotating with said member, a brush bearing on said rotating contact continuously to supply current thereto, a second contact, means mounting said second contact for movement into and out of engagement with said rotating contact, means yieldingly urging said second contact into engagement with said rotating contact, means operable on said second contact to move it away from said rotating contact, and centrifugal means rotating with said driven member for forcing said operating means in a direction to move said second contact out of engagement with the rotating contact when a predetermined speed is reached or exceeded.

2. A speed governor for an electric motor comprising a driven member, an annular shell having an annular chamber therein disposed concentrically about the axis of rotation of said driven member and connected to said member for rotation therewith, a plurality of weights spaced from one another in said chamber and each having a fulcrum at one end thereof abutting against the outer wall of the chamber, whereby when said shell is rotated, the weights will rock about their fulcrums toward the outer wall of the chamber, said weights being free and loose within said chamber, means for confining each weight against movement in a direction peripherally of said chamber means engaged by said weights at the ends opposite from the fulcrums and cammed in a direction along the axis of rotation of said shell when the weights are rocked outwardly by centrifugal action, and contact means connected to said cam operated means for opening a circuit when the weights are thrown outwardly by centrifugal action, and means yieldingly urging said contact means in a direction to oppose the outward movement of said weights, whereby said contact means will not open said circuit until the speed of said member exceeds a predetermined speed.

3. A centrifugally operated circuit breaker which comprises a rotating member, a shell connected to and rotated with said member and having an annular chamber concentric with the axis of rotation of said member, a plurality of weights disposed in said chamber at intervals around the axis of rotation of said member, means in said chamber for preventing movement of said weights in a direction circumferentially around the chamber, said weights being rockable about corresponding ends in a radial direction in said chambers, means engageable by said weights while rocking radially outward, and moved thereby in a direction endwise of said axis, and contact means opened by said endwise movement of said means.

4. A centrifugally operated circuit breaker comprising a rotating element having pockets therein extending parallel to the axis of rotation of said element and arranged at a plurality of intervals about said axis of rotation, a weight in each pocket having a heel at one end engageable with the outer wall of the pocket and the remainder of the weight being spaced from the outer wall of the pocket, whereby said weights may rock about their heels in directions radially of said axis while within said pockets, an element arranged adjacent the moving ends of said weights and cammed, by the outward radial movement of said weights, in a direction parallel to said axis, contact means separated by said endwise movement of said second element, and means yieldingly and resiliently opposing the separation of said contact means and through said second element urging said weights radially inward.

5. A centrifugally operated circuit breaker comprising a rotating element having a plurality of pockets therein at equal distances from the axis of rotation of said element and arranged at intervals about said axis, a weight in each pocket fulcrumed at one end to said element for movement of its opposite end in said pocket in an outward, approximately radial direction, a member engaged by the outwardly swinging ends of said weights and cammed by the weights in a direction parallel to said axis, a contact carried by said element and rotating therewith, and concentric about said axis, a brush bearing on said contact, a second contact mounted for movement into and out of engagement with said rotating contact, and means operated by said member and engageable with said second contact for shifting it out of engagement with said rotating contact upon said endwise movement of said member, and spring means urging said second contact yieldingly into engagement with said rotating contact, whereby said contacts will remain in engagement until the pressure on said member by said weights is sufficient to overcome said spring means.

6. A centrifugally operated circuit breaker comprising a rotating element having an annular pocket concentric with its axis of rotation, a plurality of weights disposed loosely in said pocket, each weight having at one end a heel engageable with the outer wall of said pocket as a fulcrum about which said weights may rock to carry the opposite ends in a radially outward direction, means disposed in said pocket for preventing displacement of said weights circumferentially along said pocket, a common member disposed adjacent said opposite ends of said weights and cammed in a direction parallel to said axis by the outward radial swinging of said weights, a pair of cooperating contacts, one of which is movable into and out of circuit closing engagement with the other, and means including pins shifted endwise in a direction parallel with said axis by said member, when said weights swing outwardly under centrifugal action, for shifting the movable contact out of circuit closing engagement with the other contact of said pair.

7. A centrifugally operated circuit breaker comprising a rotating element having an annular pocket concentric with its axis of rotation, a plurality of weights disposed loosely in said pocket, each weight having at one end a heel engageable with the outer wall of said pocket as a fulcrum about which said weights may rock to carry the opposite ends in a radially outward direction, means disposed in said pocket for preventing displacement of said weights circumferentially along said pocket, a common member disposed adjacent said opposite ends of said weights and cammed in a direction parallel to said axis by the outward radial swinging of said weights, a contact rotating with said element at said axis of rotation, a second contact abutting against the end of said rotating contact, a support for said second contact and guiding it into and out of engagement with the end of said rotating contact, a spring urging said support in a direction to carry said second contact into engagement with said rotating contact, and means including pins shifted endwise in a direction parallel with said axis by said member, when said weights swing outwardly under centrifugal action, and operable on the support for said second contact for moving said support and said second contact in a direction to separate said second contact from said rotating contact, said support having a fulcrum shiftable bodily in a direction parallel to said axis, and said spring bearing on said support at a distance from said fulcrum but acting in a direction parallel to said axis.

8. A centrifugally operated circuit breaker comprising a rotating element having an annular pocket concentric with its axis of rotation, a plurality of weights disposed loosely in said pocket, each weight having at one end a heel engageable with the outer wall of said pocket as a fulcrum about which said weights may rock to carry the opposite ends in a radially outward direction, means disposed in said pocket for preventing displacement of said weights circumferentially along said pocket, a common member disposed adjacent said opposite ends of said weights and cammed in a direction parallel to said axis by the outward radial swinging of said weights, a pair of contacts, one of which is movable in a direction approximately parallel to said axis of rotation of said element, into and out of circuit closing engagement with the other, means operated by said common member, upon the outward radial swinging of said weights, for moving said one contact in said direction out of circuit closing engagement with the other contact of that pair, and means for resiliently urging said one contact into circuit closing engagement with the other contact.

9. A centrifugally operated circuit breaker comprising a rotating element having an annular pocket concentric with said axis, said pocket being open at one end, a plurality of weights in said pocket and disposed at intervals about said axis, said weights being fulcrumed at the inner end of said pocket for movement of the outer ends of said weights in a radially outward direction by centrifugal force, a member disposed adjacent the open end of said pocket and cammed in a direction parallel to said axis by the outer ends of said weights upon said outward movement of said weights, pins reciprocated in a direction parallel to said axis by said member when said member is cammed along said axis by said weights, a contact relatively fixed against movement in a direction parallel to said axis, a second contact, a support for said second contact and shifting it in a direction parallel to said axis into and out of engagement with said first contact, a spring device acting on said support for urging it in a direction to carry said second contact into engagement with the first contact, said support being operable by said pins in a direction to carry said second contact out of engagement with the first contact when said member is moved by the outward radial movement of said weights.

10. A centrifugally operated circuit breaker comprising a rotating shaft, an annular shell disposed concentrically of said shaft in spaced relation thereto, means mounting one end of said shell on said shaft for rotation therewith, said shell having an annular pocket therein concentric with said shaft and open at the opposite end of said shell, said shaft terminating adjacent the open end of said pocket, an annular member disposed in said pocket and movable in a direction along said shaft, centrifugal means in said pocket and acting on said member for moving it endwise along said shaft in one direction, means abutting against said member for operation by said member, a pair of cooperating contacts, a support mounting one of said contacts for movement into and out of engagement with the other of said contacts, a spring device acting on said support for urging it in a direction to engage said other of said contacts, said abutting means acting on said support to shift it against the action of said spring and separate said contacts whenever said member is moved along said shaft by the centrifugal action of said weights.

11. A centrifugally operated circuit breaker comprising a rotating shaft, an annular shell disposed concentrically of said shaft in spaced relation thereto, means mounting one end of said shell on said shaft for rotation therewith, said shell having an annular pocket therein concentric with said shaft and open at the opposite end of said shell, said shaft terminating adjacent the open end of said pocket, a contact secured to the end of said shaft and rotating therewith, an annular member disposed in said pocket and movable in a direction along said shaft, centrifugal means in said pocket and acting on said member for moving it endwise along said shaft in one direction, a stationary casing disposed at the end of said shaft, pins mounted for reciprocation in said casing in a direction along said shaft, and abutting against said member for operation endwise by said member, a second contact, a support mounting said second contact for movement into and out of engagement with the end of said rotating contact, a spring device acting on said support for urging it in a direction to engage said second contact with said rotating contact, said pins acting on said support to shift it against the action of said spring and separate said contacts whenever said member is moved along said shaft by the centrifugal action of said weights, said rotating contact being detachably connected to the end of said shaft, and a brush bearing on said rotating contact.

12. A centrifugally operated circuit breaker comprising a rotating element having an annular chamber concentric with its axis of rotation, a plurality of free weights disposed in said chamber and arranged at intervals around said axis, means in said chamber for preventing material displacement of said weights in a direction circumferentially of said chamber, said chamber being open at one end and closed at the other, each weight at its end adjacent the closed end of said chamber having a heel engageable with and rockable on the outer wall of said chamber, each weight being free to swing about its heel in a direction radially of said axis, an annular member disposed at the open end of said chamber, movable in a direction into and out of the chamber, and cammed in a direction outwardly of the chamber and parallel to said axis by the free swinging ends of said weights, and normally closed contact means operated into open circuit condition by the movement of said member, when said member is cammed in a direction outwardly of said chamber by said weights.

13. A centrifugally operated circuit breaker comprising a rotating element having an annular chamber concentric with its axis of rotation, a plurality of weights disposed in said chamber and arranged at intervals around said axis, and each fulcrumed for swinging movement about one end thereof somewhat radially of said axis, said chamber being open at one end and closed at the other, the free ends of said weights being at the same end of said chamber and each having a cam surface extending at an inclination to the axis of said shaft, with the end of the inclination that is adjacent the free end of the weight disposed nearest to said axis, a member disposed adjacent the open end of said chamber for movement in a direction into and out of said chamber, ball bearing means acting between said member and the cam surfaces of said weights, by which the outwardly swinging ends of said weights will cam said member in a direction outwardly of said chamber and parallel to said shaft, and normally closed contact means operated into open circuit condition by the movement of said member, when said member is cammed in a direction outwardly of said chamber by said weights.

14. A centrifugally operated circuit breaker comprising a shaft, an element mounted on the shaft for rotation therewith, and having an annular casing surrounding and spaced from said shaft, said casing having an open end adjacent the free end of said shaft, a second casing telescoping over the rotating casing and having a boss fitting over said shaft and entering the space between the shaft and the rotating casing, said shaft extending through said second casing and terminating exteriorly thereof in a contact which rotates with the shaft, a brush bearing on said rotating contact, a contact support mounted on said second casing, a second contact mounted on said support and movable with said support into and out of engagement with the end of said rotating contact, a spring device urging said support yieldingly in a direction to engage said second contact with said rotating contact, pins reciprocating in said second casing and engageable with said support to move it against the action of said spring device and separate said contacts, and centrifugal means disposed in said annular casing and operable by centrifugal action on said pins to force them in a direction to open said contacts when said shaft exceeds a predetermined speed.

15. A centrifugally operated circuit breaker comprising a rotating element, a plurality of weights carried by said element and fulcrumed to swing outwardly by centrifugal action, the free ends of said weights having slots therein extending in a direction radially of the axis of rotation of said element, the bottom of each slot being inclined to said axis of rotation of said element and facing outwardly, bearing balls disposed in said slots, a bearing ring disposed adjacent the free ends of said weights and engaged by said balls, said bearing ring being movable in a direction along said axis, whereby when said weights swing outwardly by centrifugal action, the inclined bottom walls of said slots will act through said balls to cam said ring in a direction along said axis of rotation, pins bearing on said ring and cammed endwise by movement of said ring along said axis, and circuit controlling means actuated into open circuit condition by such endwise movement of said pins.

16. A centrifugally operated circuit breaker comprising a rotating element, a plurality of weights carried by said element and fulcrumed to swing outwardly by centrifugal action, the free ends of said weights having slots therein extending in a direction radially of the axis of rotation of said element, the bottom of each slot being inclined to said axis of rotation of said element and facing outwardly, bearing balls disposed in said slots, a bearing ring disposed adjacent the free ends of said weights and engaged by said balls, said bearing ring being movable in a direction along said axis, whereby when said weights swing outwardly by centrifugal action, the inclined bottom walls of said slots will act through said balls to cam said ring in a direction along said axis of rotation, said ring having a peripheral flange along its outer edge and extending toward said weights and somewhat overrunning said balls, and the side walls of said slots at points adjacent their outer ends being upset inwardly into the slot to prevent escape of the balls through the outer ends of the slots, and circuit controlling means actuated into open circuit condition by such endwise movement of said ring.

17. In a centrifugally operated circuit breaker, a rotating element having a pocket at one side of the axis of rotation of said element, a weight disposed in said pocket and having at one end a projecting heel engageable with the outer wall of said pocket so as to fulcrum thereon, the other end of said weight being swingable in said pocket about said fulcrum in a direction toward and from said axis of rotation, means disposed adjacent the swinging end of said weight and cammed by said weight in a direction parallel to said axis, and circuit controlling means operated into open circuit position by the movement of said first means under the action of said weight when said weight swings outwardly by centrifugal action.

JEROME A. FRIED.